US012044376B2

(12) United States Patent
Wu et al.

(10) Patent No.: US 12,044,376 B2
(45) Date of Patent: Jul. 23, 2024

(54) REFLECTING DEVICE, VEHICLE LAMP AND VEHICLE

(71) Applicant: VALEO VISION, Bobigny (FR)

(72) Inventors: Sihua Wu, Bobigny (FR); Yagui Gao, Bobigny (FR); Bing Zhang, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 18/259,493

(22) PCT Filed: Dec. 22, 2021

(86) PCT No.: PCT/EP2021/087271
§ 371 (c)(1),
(2) Date: Jun. 27, 2023

(87) PCT Pub. No.: WO2022/144269
PCT Pub. Date: Jul. 7, 2022

(65) Prior Publication Data

US 2024/0060615 A1 Feb. 22, 2024

(30) Foreign Application Priority Data

Jan. 4, 2021 (CN) ......................... 202120004493.1

(51) Int. Cl.
*F21S 41/33* (2018.01)
*F21S 41/145* (2018.01)

(52) U.S. Cl.
CPC ............. *F21S 41/33* (2018.01); *F21S 41/145* (2018.01)

(58) Field of Classification Search
CPC ................................ F21S 41/33; F21S 41/145
See application file for complete search history.

(56) References Cited

U.S. PATENT DOCUMENTS

2017/0238277 A1 8/2017 Irgang et al.
2021/0123580 A1 4/2021 Yatabe

FOREIGN PATENT DOCUMENTS

DE 10 2013 206 850 A1 10/2014
JP 2013-171813 A 9/2013
JP 2020-98715 A 6/2020
WO WO 2019/225645 A1 11/2019

OTHER PUBLICATIONS

Machine Translation of DE 10 2013206850A1 (Year: 2013).*
International Search Report Issued Apr. 20, 2022, in PCT/EP2021/087271, filed on Dec. 22, 2021, 3 pages.

* cited by examiner

*Primary Examiner* — Anne M Hines
(74) *Attorney, Agent, or Firm* — Oblon, McClelland, Maier & Neustadt, L.L.P.

(57) ABSTRACT

A reflecting device includes at least one reflecting cavity corresponding to at least one light source. A first reflecting cavity located at an extremity of the reflecting device includes a first reflecting part, able to receive incident light from the light source corresponding to the first reflecting cavity, and reflect this light towards the second reflecting part. A second reflecting part adjoins the first reflecting part is able to reflect the reflected light from the first reflecting part towards the outside of the first reflecting cavity. The first reflecting cavity at the extremity of the reflecting device may include a first reflecting part and a second reflecting part, which are able to subject light rays from the light source to double reflection. This can considerably increase the design flexibility of the first reflecting cavity.

16 Claims, 6 Drawing Sheets

REFLECTING DEVICE, VEHICLE LAMP AND VEHICLE

TECHNICAL FIELD

The present invention relates to the technical field of vehicle lamps, in particular to a reflecting device, a vehicle lamp and a vehicle.

BACKGROUND ART

Lighting devices are indispensable components in lighting and/or optical signal indicating devices of all kinds, being used to provide light for lighting and/or optical indication, and widely applied in various fields; for example, lighting devices such as vehicle lamps are used in motor vehicles to ensure safe travel. Vehicle lamps of various types are often needed on motor vehicles to perform different functions, including motor vehicle headlights, fog lights, tail lights, direction indicator lights, brake lights and parking lights, etc.

In the prior art, the combination of a light source and a reflecting device is a common form of implementation of a vehicle lamp. However, in the case of vehicles in which the interior cavity of the vehicle lamp is extremely restricted due to special modelling, the question of how to design the reflecting device to meet light distribution requirements becomes a key issue.

SUMMARY OF THE INVENTION

Therefore, an objective of the present invention is to propose a reflecting device, a vehicle lamp and a vehicle, which can at least partially solve the above-mentioned problems.

According to one aspect of the present invention, a reflecting device is provided, comprising at least one reflecting cavity corresponding to at least one light source; of the at least one reflecting cavity, a first reflecting cavity located at an extremity of the reflecting device comprises:

- a first reflecting part, able to receive incident light from the light source corresponding to the first reflecting cavity, and reflect this light towards the second reflecting part;
- a second reflecting part, adjoining the first reflecting part, and able to reflect the reflected light from the first reflecting part towards the outside of the first reflecting cavity.

According to an embodiment of the present invention, the first reflecting cavity at the extremity of the reflecting device comprises a first reflecting part and a second reflecting part, which are able to subject light rays from the light source to double reflection. This is hugely advantageous in situations where there is limited space for arranging the first reflecting cavity, and compared with the case where the first reflecting cavity comprises only one reflecting part, can considerably increase the design flexibility of the first reflecting cavity.

In one embodiment, a reflective surface of the first reflecting part is a paraboloid, and a reflective surface of the second reflecting part is substantially a flat surface.

In one embodiment, the at least one reflecting cavity further comprises multiple second reflecting cavities, each of the second reflecting cavities comprising:

- a third reflecting part, able to receive incident light of the light source corresponding to the second reflecting cavity, and reflect this light towards the outside of the second reflecting cavity;

- a connecting part, able to connect the third reflecting parts of two adjacent second reflecting cavities together.

In one embodiment, a reflective surface of the third reflecting part is a paraboloid.

In one embodiment, the reflecting device is integrally formed.

According to another aspect of the present invention, a vehicle lamp is further provided, comprising:

- at least one light source;
- any one of the reflecting devices described above;
- a housing, an extremity thereof having a bent part;
- an outer lens, the outer lens being mounted at a front side of the housing in a length direction of a vehicle, the at least one light source and the reflecting device being arranged in a cavity enclosed by the housing and the outer lens, and the first reflecting cavity being at least partially arranged in a cavity enclosed by the outer lens and the bent part.

According to an embodiment of the present invention, due to the limited space in the cavity enclosed by the outer lens and the bent part, by designing the first reflecting cavity arranged in this space so that it subjects light rays from the light source to double reflection using the first reflecting part and second reflecting part, the design flexibility of the first reflecting cavity can be considerably increased compared with the case where the first reflecting cavity comprises only one reflecting part.

In one embodiment, the bent part comprises a first wall and a second wall, the first reflecting part extends towards the first wall, and the second reflecting part extends towards the second wall.

According to an embodiment of the present invention, the shape of the bent part can be better matched by having the first reflecting part extend towards the first wall and the second reflecting part extend towards the second wall; furthermore, interference between the second reflecting part and the second wall can be avoided if the second reflecting part is designed substantially as a flat plate.

In one embodiment, the vehicle lamp further comprises another reflecting device, the reflecting device and the other reflecting device being arranged in an offset fashion in a height direction of the vehicle.

In one embodiment, the reflecting device is configured to realize a direction indicator light function, and the other reflecting device is used for a tail light function.

According to another aspect of the present invention, a vehicle is further provided which comprises the vehicle lamp as described above.

BRIEF DESCRIPTION OF THE DRAWINGS

The above-described characteristics, technical features and advantages of the present invention and modes of implementation thereof will be further explained below in a clear and easy-to-understand manner through a description of preferred embodiments with reference to the drawings, wherein.

DETAILED DESCRIPTION OF THE INVENTION

Embodiments of the present invention are described demonstratively below. As those skilled in the art should realize, the embodiments explained may be amended in various ways without departing from the concept of the present invention. Thus, the accompanying drawings and the specification are in essence demonstrative and non-limiting. In the following text, identical drawing reference labels generally indicate functionally identical or similar elements.

Figure 1:
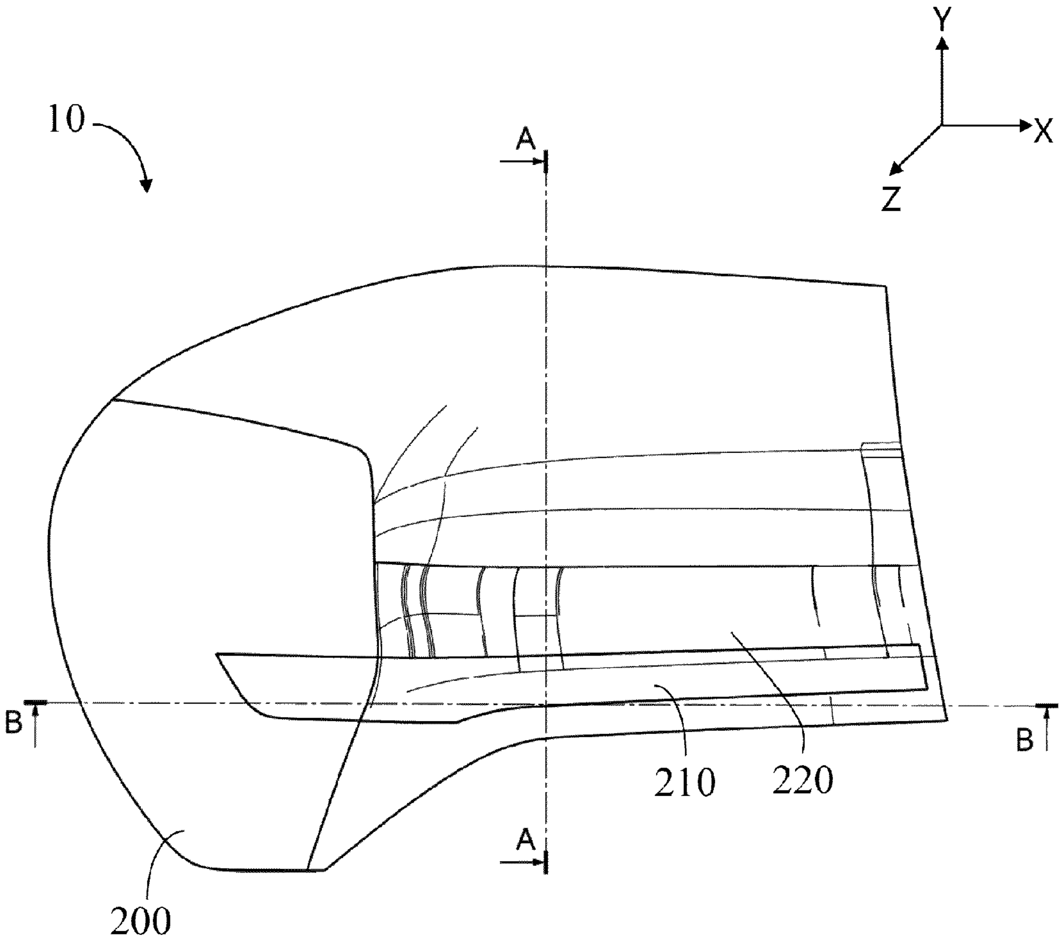
FIG. 1 is a main view of a vehicle lamp 10 according to an embodiment of the present invention.
Figure 2:
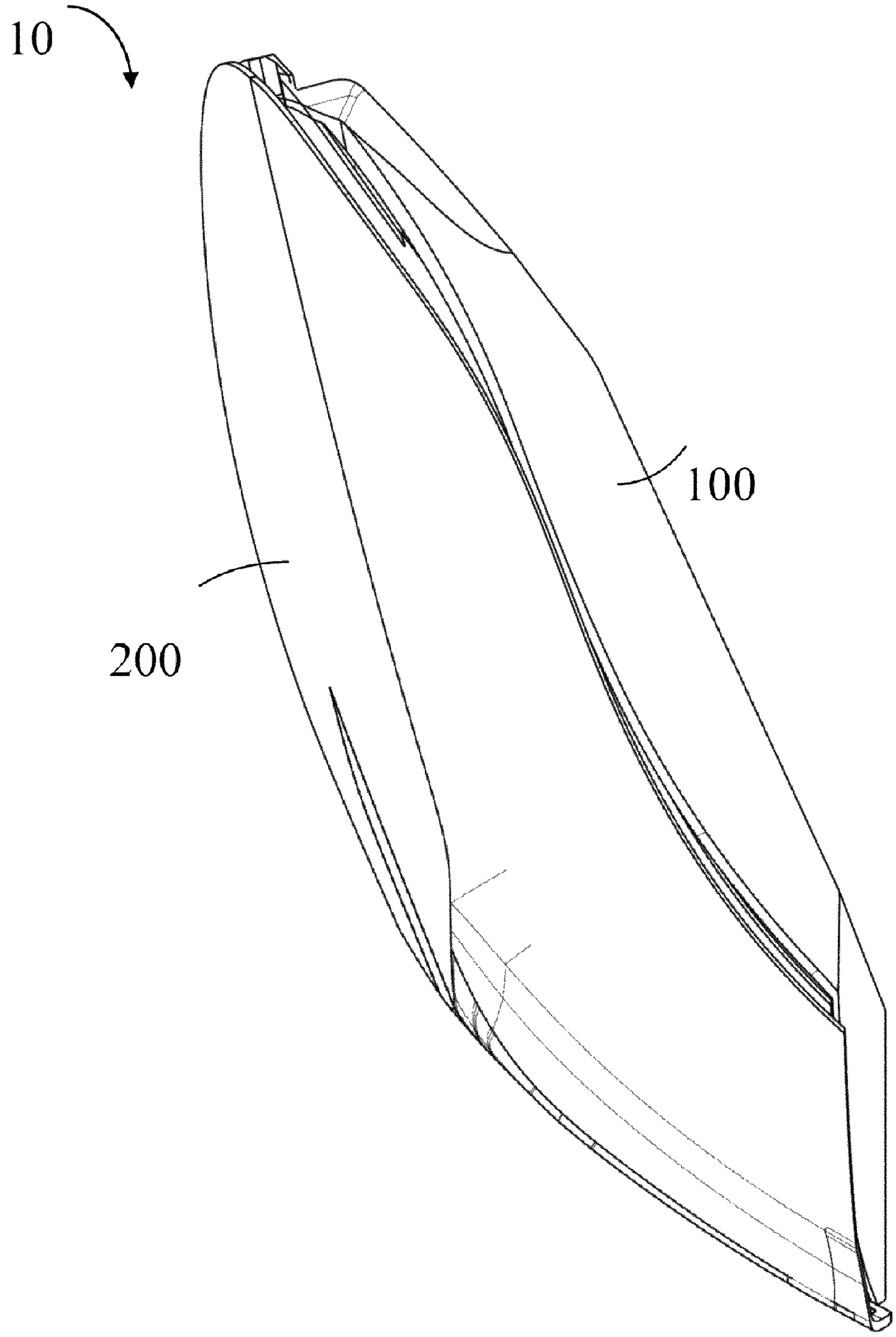
FIG. 2 is a top view of the vehicle lamp 10 in FIG. 1.
Figure 3:
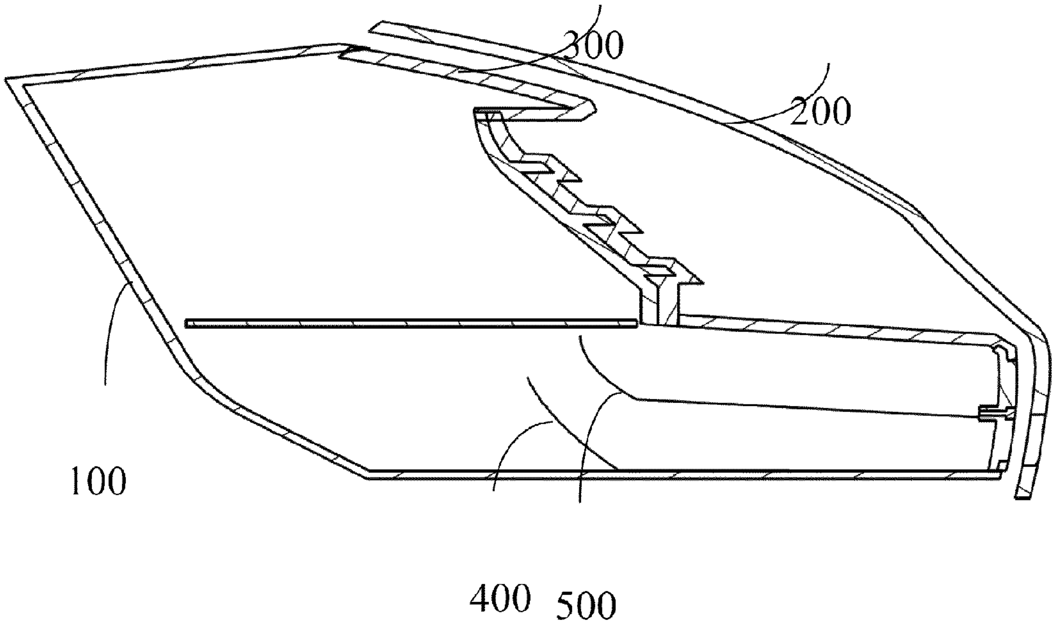
FIG. 3 is a sectional view of the vehicle lamp 10 in FIG. 1 along line A-A.
Figure 4:
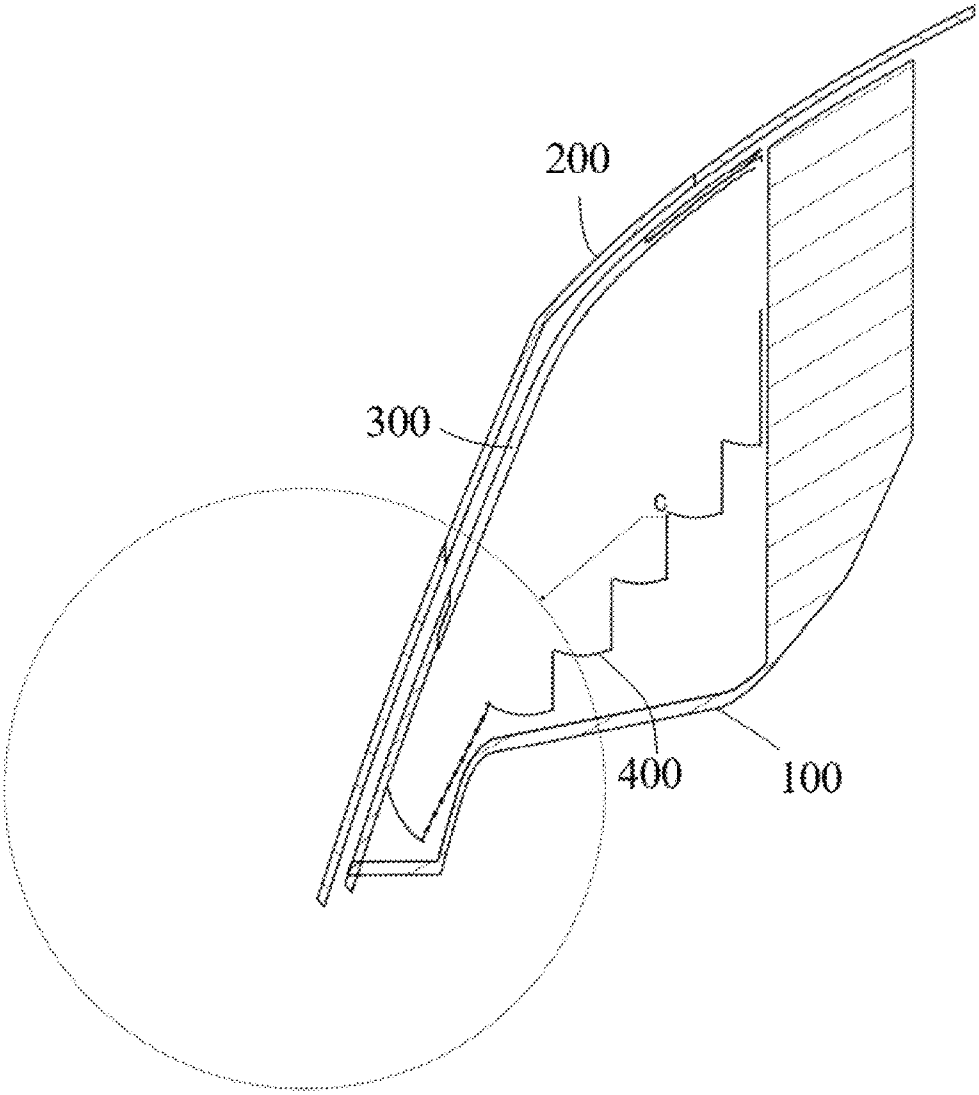
FIG. 4 is a sectional view of the vehicle lamp 10 in FIG. 1 along line B-B.

FIG. 1 shows a main view of a vehicle lamp 10 according to an embodiment of the present invention, wherein the X direction represents a width direction of a vehicle, the Y direction represents a height direction of the vehicle, and the Z direction represents a length direction of the vehicle; FIG. 2 shows a top view of the vehicle lamp 10 in FIG. 1, FIG. 3 shows a sectional view of the vehicle lamp 10 in FIG. 1 along line A-A, and FIG. 4 shows a sectional view of the vehicle lamp 10 in FIG. 1 along line B-B. As shown in FIGS. 1-4, the vehicle lamp 10 comprises a housing 100, an outer lens 200, an excess plate 300, a first reflecting device 400 and a second reflecting device 500, wherein the outer lens 200 is mounted at a front side of the housing 100 in the length direction Z of the vehicle, and the excess plate 300, first reflecting device 400 and second reflecting device 500 are arranged in a cavity enclosed by the housing 100 and the outer lens 200. Specifically, the excess plate 300 is arranged at a rear side of the outer lens 200 in the length direction of the vehicle, and configured to screen electronic/optical elements in the vehicle lamp 10 and serve an ornamental function; the first reflecting device 400 and second reflecting device 500 are arranged in an offset fashion close to a bottom side of the housing 100 in the height direction Y of the vehicle, e.g. the first reflecting device 400 is arranged below the second reflecting device 500. The first reflecting device 400 and second reflecting device 500 may be configured to realize different lighting functions; for example, the first reflecting device 400 is configured to realize a direction indicator light function, while the second reflecting device 500 is configured to realize a tail light function, but there is no limitation to this.

Furthermore, as shown in FIG. 1, the outer lens 200 may comprise a first lens part 210 and a second lens part 220, wherein the first lens part 210 is configured to transmit reflected light from the first reflecting device 400, and the second lens part 220 is configured to transmit reflected light from the second reflecting device 500. In one non-limiting example, the outer lens 200 may be a red lens, and the first lens part 210 and second lens part 220 may be colourless lenses.

It must be explained that the vehicle lamp 10 may further comprise other optical/electronic elements not shown in FIGS. 1-4, for example, but not limited to, at least one light source and a PCB carrying the light source.

Figure 5:
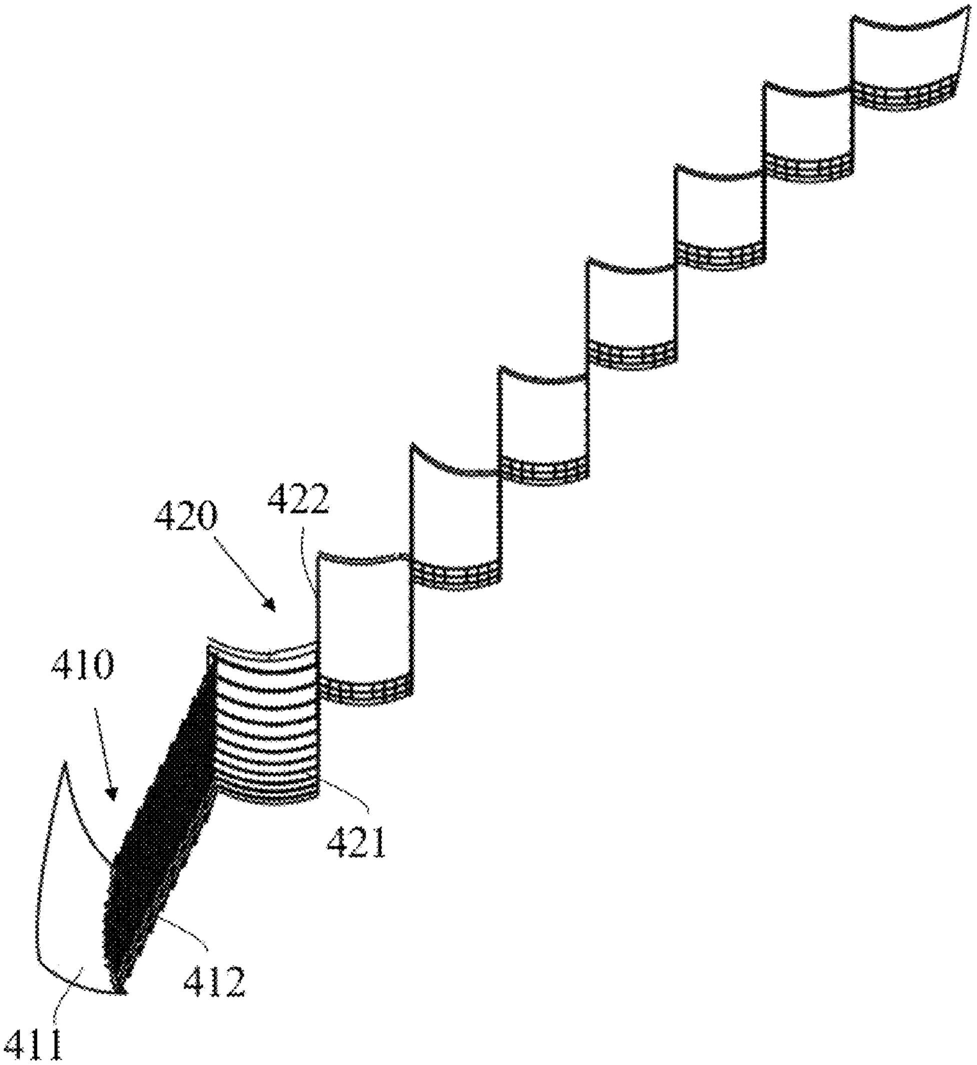
FIG. 5 is a top view of a first reflecting device 400 according to an embodiment of the present invention.
Figure 6:
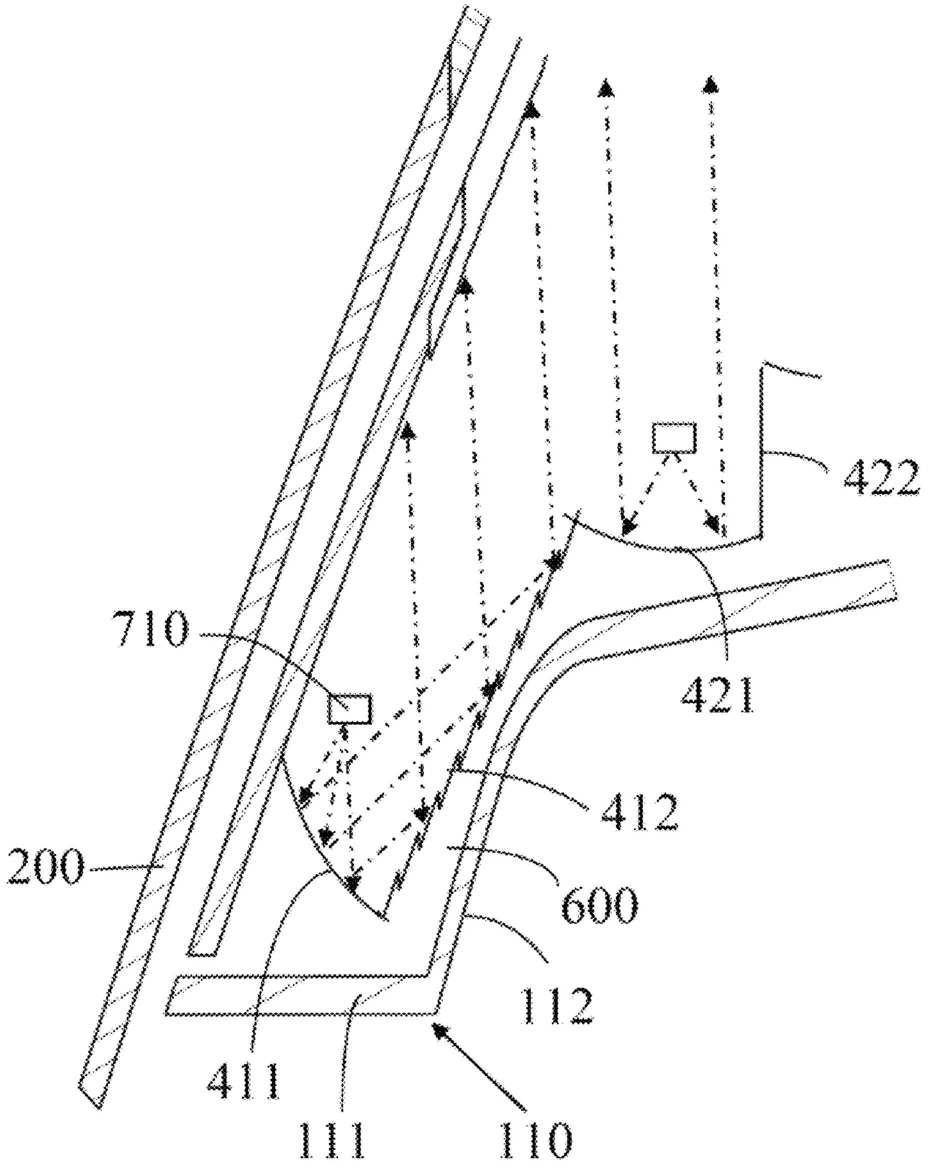
FIG. 6 is a partial enlarged drawing of region C in FIG. 4, and a schematic light path diagram of a first reflecting cavity 410.

FIG. 5 shows a top view of the first reflecting device 400 according to an embodiment of the present invention; FIG. 6 shows a partial enlarged drawing of region C in FIG. 4. As shown in FIGS. 5 and 6, the first reflecting device 400 comprises a first reflecting cavity 410 and multiple second reflecting cavities 420, wherein the first reflecting cavity 410 is located at an extremity of the first reflecting device 400. The housing 100 comprises a bent part 110; a first wall 111 and a second wall 112 of the bent part 110, together with the outer lens 200, enclose a U-shaped cavity 600. The first reflecting cavity 410 is at least partially arranged inside the U-shaped cavity 600, while the second reflecting cavities 420 are arranged outside the U-shaped cavity 600. Each reflecting cavity of the first reflecting device 400 corresponds to at least one light source.

As shown in FIG. 5, the first reflecting cavity 410 comprises a first reflecting part 411 and a second reflecting part 412 adjoining the first reflecting part 411; as shown in FIG. 6, the first reflecting part 411 extends towards the first wall 111 of the bent part, and is able to receive incident light from a light source 710 corresponding to the first reflecting cavity 410, and reflect this light towards the second reflecting part 412. The second reflecting part 412 extends towards the second wall 112 of the bent part, and is able to reflect reflected light from the first reflecting cavity 410 towards the outside of the first reflecting cavity 410; specifically, the second reflecting part 412 is capable of reflection towards the first lens part 210 on the outer lens 200.

In one example, a reflective surface of the first reflecting part 411 is a paraboloid, and preferably, the light source 710 may be arranged at the focus of the paraboloid, such that light reflected by the first reflecting part 411 is collimated light, thus making it possible to increase the optical efficiency; a reflective surface of the second reflecting part 412 is substantially a flat surface, and is thus able to better match the bent part 110.

In one example, the angle between the first reflecting part 411 and the second reflecting part 412 may be adjusted according to the relative positions of the bent part 110 and the first lens part 210, such that the second reflecting part 412 reflects light rays towards the first lens part 210.

As shown in FIG. 5, the second reflecting cavity 420 comprises a third reflecting part 421 and a connecting part 422 adjoining the third reflecting part 421; as shown in FIG. 6, the third reflecting part 421 is able to receive incident light of a light source 720 corresponding to the second reflecting cavity 420, and reflect this light towards the outside of the second reflecting cavity 420, specifically towards the first lens part 210. The connecting part 422 is able to connect the third reflecting parts 421 of two adjacent second reflecting cavities 420 together.

In one example, a reflective surface of the third reflecting part 421 is a paraboloid, and preferably, the light source 720 may be arranged at the focus of the paraboloid, such that light reflected by the third reflecting part 421 is collimated light, thus making it possible to increase the optical efficiency.

In one example, the various reflecting cavities of the first reflecting device may be integrally formed.

Preferably, the projected lengths of the second reflecting part 412 and third reflecting part 421 in the width direction X of the vehicle are the same; this makes it possible for the widths of reflected light beams of the second reflecting part 412 and third reflecting part 421 to be kept the same, thus improving the appearance of the lighting.

As can be seen from the description above, if the reflecting cavity at the extremity of the first reflecting device were to employ the design of the second reflecting cavity, then the third reflecting part having the form of a paraboloid would interfere with the second wall of the bent part. Thus, in an embodiment of the present invention, for the reflecting cavity at the extremity of the first reflecting device, the first reflecting part and second reflecting part are used for double reflection, wherein the shape of the bent part can be better matched by having the first reflecting part extend towards the first wall and the second reflecting part extend towards the second wall; furthermore, interference between the second reflecting part and the second wall can be avoided by designing the second reflecting part substantially as a flat plate.

In one example, the second reflecting device 500 may also comprise a plurality of the second reflecting cavities 420 described above, but unlike the first reflecting device 400, the third reflecting parts 421 need to reflect light rays towards the second lens part 220.

According to an embodiment of the present invention, a vehicle is further provided which comprises the vehicle lamp as described above.

The present invention is not limited to the structure described above; various other variants could also be used. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

The invention claimed is:

1. A reflecting device, comprising at least one reflecting cavity corresponding to at least one light source; wherein, of the at least one reflecting cavity, a first reflecting cavity located at an extremity of the reflecting device comprises a first reflecting part and a second reflecting part, wherein:

the first reflecting part is able to receive incident light from the light source corresponding to the first reflecting cavity, and reflect the light towards the second reflecting part;

the second reflecting part adjoins the first reflecting part, and is able to reflect the reflected light from the first reflecting part towards the outside of the first reflecting cavity; and at least one reflecting cavity further comprises multiple second reflecting cavities, each of the second reflecting cavities comprising:

a third reflecting part, the third reflecting part being able to receive incident light of the light source corresponding to the second reflecting cavity, and reflect the light towards the outside of the second reflecting cavity; and a connecting part, the connecting part being able to connect the third reflecting parts of two adjacent said second reflecting cavities together.

2. The reflecting device according to claim 1, wherein a reflective surface of the first reflecting part is a paraboloid, and a reflective surface of the second reflecting part is substantially a flat surface.

3. The reflecting device according to claim 2, wherein the reflecting device is integrally formed.

4. A vehicle lamp, comprising:

at least one light source;

the reflecting device according to claim 2;

a housing, an extremity of the housing having a bent part;

an outer lens, the outer lens being mounted at a front side of the housing in a length direction of a vehicle, the at least one light source and the reflecting device being arranged in a cavity enclosed by the housing and the outer lens, and the first reflecting cavity being at least partially arranged in a cavity enclosed by the outer lens and the bent part.

5. The reflecting device according to claim 1, wherein a reflective surface of the third reflecting part is a paraboloid.

6. The reflecting device according to claim 5, wherein the reflecting device is integrally formed.

7. A vehicle lamp, comprising:

at least one light source;

the reflecting device according to claim 4;

a housing, an extremity of the housing having a bent part;

an outer lens, the outer lens being mounted at a front side of the housing in a length direction of a vehicle, the at least one light source and the reflecting device being arranged in a cavity enclosed by the housing and the outer lens, and the first reflecting cavity being at least partially arranged in a cavity enclosed by the outer lens and the bent part.

8. The reflecting device according to claim 1, wherein the reflecting device is integrally formed.

9. A vehicle lamp comprising:

at least one light source;

the reflecting device according to claim 1;

a housing, an extremity of the housing having a bent part;

an outer lens, the outer lens being mounted at a front side of the housing in a length direction of a vehicle, the at least one light source and the reflecting device being arranged in a cavity enclosed by the housing and the outer lens, and the first reflecting cavity being at least partially arranged in a cavity enclosed by the outer lens and the bent part.

10. The vehicle lamp according to claim 9, wherein the bent part comprises a first wall and a second wall, the first reflecting part extends facing the first wall, and the second reflecting part extends facing the second wall.

11. A vehicle comprising the vehicle lamp as claimed in claim 10.

12. A vehicle comprising the vehicle lamp as claimed in claim 9.

13. A vehicle lamp comprising:

at least one light source;

a reflecting device, comprising at least one reflecting cavity corresponding to at least one light source; wherein, of the at least one reflecting cavity, a first reflecting cavity located at an extremity of the reflecting device comprises a first reflecting part and a second reflecting part, wherein:

the first reflecting part is able to receive incident light from the light source corresponding to the first reflecting cavity, and reflect the light towards the second reflecting part;

the second reflecting part adjoins the first reflecting part, and is able to reflect the reflected light from the first reflecting part towards the outside of the first reflecting cavity; and wherein the vehicle lamp further comprising another reflecting device, the reflecting device and the other reflecting device being arranged in an offset fashion in a height direction of the vehicle.

14. The vehicle lamp according to claim 13, wherein the reflecting device is configured to realize a turn indicator light function, and the other reflecting device is used for a tail light function.

15. A vehicle comprising the vehicle lamp as claimed in claim 14.

16. A vehicle comprising the vehicle lamp as claimed in claim 13.

* * * * *